(12) United States Patent
Wang et al.

(10) Patent No.: US 12,505,582 B2
(45) Date of Patent: Dec. 23, 2025

(54) IMAGE COMPRESSION PERFORMANCE OPTIMIZATION FOR IMAGE COMPRESSION

(71) Applicant: Adobe Inc., San Jose, CA (US)

(72) Inventors: Haoliang Wang, San Carlos, CA (US); Stefano Petrangeli, Mountain View, CA (US); Viswanathan Swaminathan, Saratoga, CA (US)

(73) Assignee: Adobe Inc., San Jose, CA (US)

( * ) Notice: Subject to any disclaimer, the term of this patent is extended or adjusted under 35 U.S.C. 154(b) by 384 days.

(21) Appl. No.: 17/895,758

(22) Filed: Aug. 25, 2022

(65) Prior Publication Data

US 2024/0070927 A1    Feb. 29, 2024

(51) Int. Cl.
*G06T 9/40* (2006.01)
*G06T 3/40* (2024.01)

(52) U.S. Cl.
CPC . *G06T 9/40* (2013.01); *G06T 3/40* (2013.01)

(58) Field of Classification Search
CPC .................................. G06T 9/40; G06T 3/40
See application file for complete search history.

(56) References Cited

U.S. PATENT DOCUMENTS

| 12,026,624 B2 | 7/2024 | Gonzalez et al. | |
| 2007/0019867 A1* | 1/2007 | Kwon | H04N 1/417 382/232 |
| 2021/0150678 A1* | 5/2021 | Yi | G06T 3/4046 |

OTHER PUBLICATIONS

Akimov, Alexander et al. "Lossless compression of color map images by context tree modeling." IEEE, 2006. (Year: 2006).*
Sneyers, Jon et al. "FLIF: Free lossless image format based on MANIAC compression." IEEE, 2016. (Year: 2016).*
A Holub, P. Perona and M. C. Burl, "Entropy-based active learning for object recognition," 2008 IEEE Computer Society Conference on Computer Vision and Pattern Recognition Workshops, Anchorage, AK, USA, 2008, pp. 1-8 (Year: 2008).
F. Pourkamali-Anaraki and W. D. Bennette, "Adaptive Data Compression for Classification Problems," in IEEE Access, vol. 9, pp. 157654-157669, 2021 (Year: 2021).
Notice of Allowance received for U.S. Appl. No. 17/749,846, mailed on Sep. 28, 2024, 8 pages.

* cited by examiner

*Primary Examiner* — Oneal R Mistry
*Assistant Examiner* — Nhut Huy Pham
(74) *Attorney, Agent, or Firm* — Shook, Hardy & Bacon L.L.P.

(57) ABSTRACT

The context-aware optimization method includes training a context model by determining whether to split each node in the context by identifying a first subset of virtual context to evaluate by identifying a second subset of virtual contexts to evaluate and obtaining an encoding cost of splitting of the context model for each virtual context in the second subset and identifying the first subset of virtual contexts to evaluate by selecting a predetermined number of virtual contexts from the second subset based on the encoding cost such that the predetermined number of virtual contexts with lowest encoding cost are selected. The modified tree-traversal method includes encoding a mask or performing a speculative-based method. The modified entropy coding method includes representing data into an array of bits, using multiple coders to process each bit in the array and combining the output from the multiple coders into a data range.

20 Claims, 11 Drawing Sheets

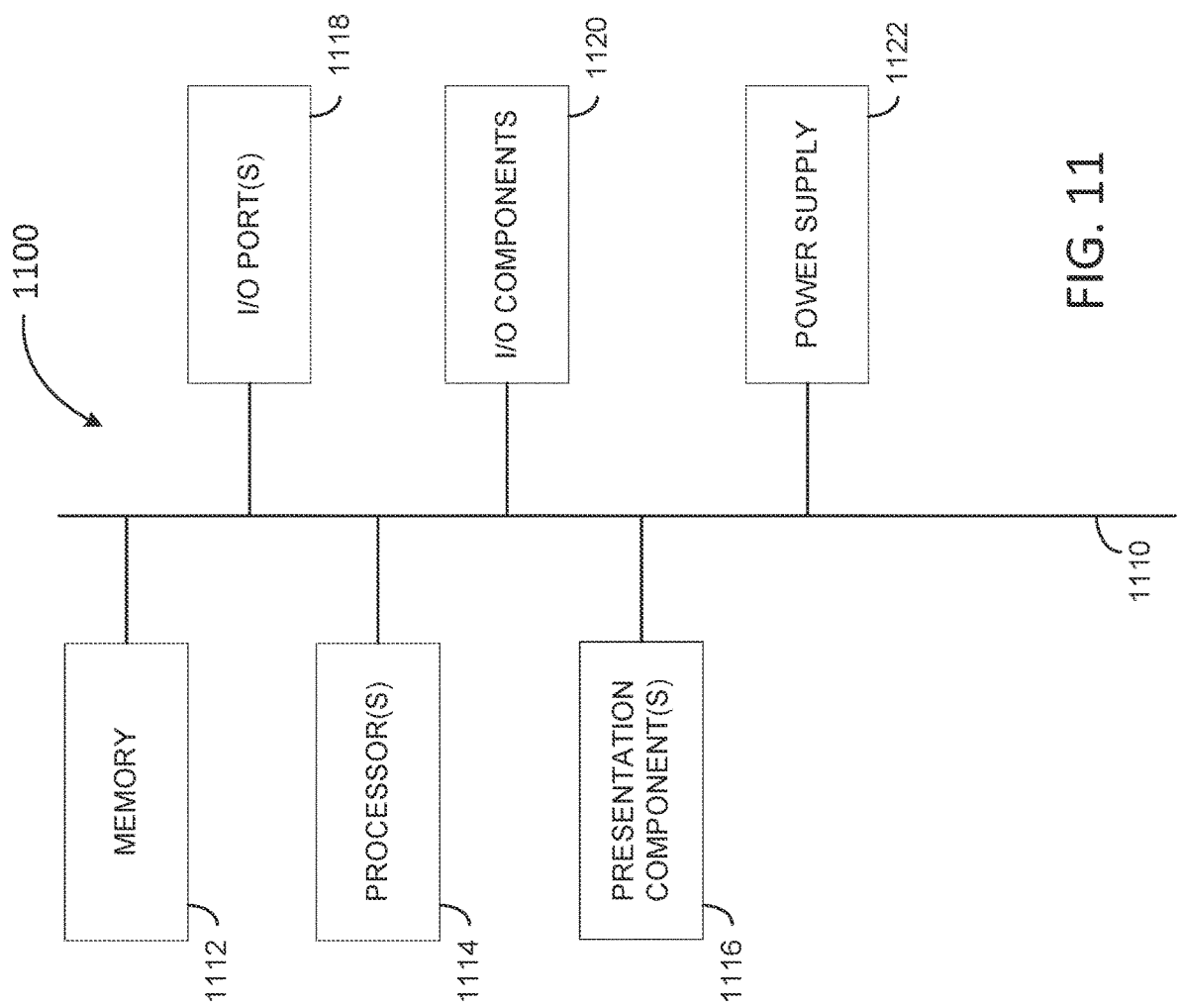

IMAGE COMPRESSION PERFORMANCE OPTIMIZATION FOR IMAGE COMPRESSION

BACKGROUND

With data becoming more and more abundant, cloud technologies are becoming increasingly important for image and other data storage. To efficiently transmit and store images and other data, data processing algorithms, such as image compression algorithms are used. Conventional image compression algorithms include a modeling phase and an encoding or decoding phase. The modeling phase uses prediction modeling and context modeling to gather information about the image data and put it in a form of a probabilistic model. For example, the prediction modeling predicts the pixel values and groups pixels with similar characteristics. Context-modeling builds a probabilistic model or a decision tree. The encoding or decoding phase uses an entropy coder to compress or decompress the data based on the model. However, some of these processes can be computationally inefficient and time-consuming.

SUMMARY

Embodiments of the present disclosure are directed towards facilitating image compression performance optimization for image compression. In accordance with embodiments of the present disclosure, an image compression performance optimization system includes one or more of: a probabilistic context evaluation module, a modified tree-traversal module, and a modified Asymmetric Numeral Systems (ANS) entropy coding module. In particular, embodiments described herein using the probabilistic context evaluation module evaluates of the contexts of a tree or any other model to enable a more efficient and faster training of the context-modeling decision tree during encoding. The probabilistic context evaluation module identifies a portion of contexts, evaluates the encoding cost of further dividing of the tree or any model into contexts that are encoded independently based on the identified portion of the plurality of context. The modified tree-traversal module is used to efficiently navigate a tree, especially during decoding an image. The modified tree-traversal module uses either a binary mask or a speculative-based method to traverse the tree or a combination of both. The binary mask allows the modified tree-traversal module to indicate similarity of neighboring pixels that can allow for faster navigation of the tree. The modified tree-traversal module can be used in a tree or any other model. The modified ANS entropy coding module uses a Bitwise ANS to allow for faster entropy encoding and decoding. The modified ANS entropy coding module represents data into an array of bits format, use multiple coders to process each bit and combines the output from the multiple coders into a data range. The modified ANS entropy coding module can be applied to any entropy coding purpose.

BRIEF DESCRIPTION OF THE DRAWINGS

The technology described herein is described in detail below with reference to the attached drawing figures, wherein:

FIG. 11 is an exemplary operating environment for implementing embodiments of the present technology

DETAILED DESCRIPTION

Figure 1:
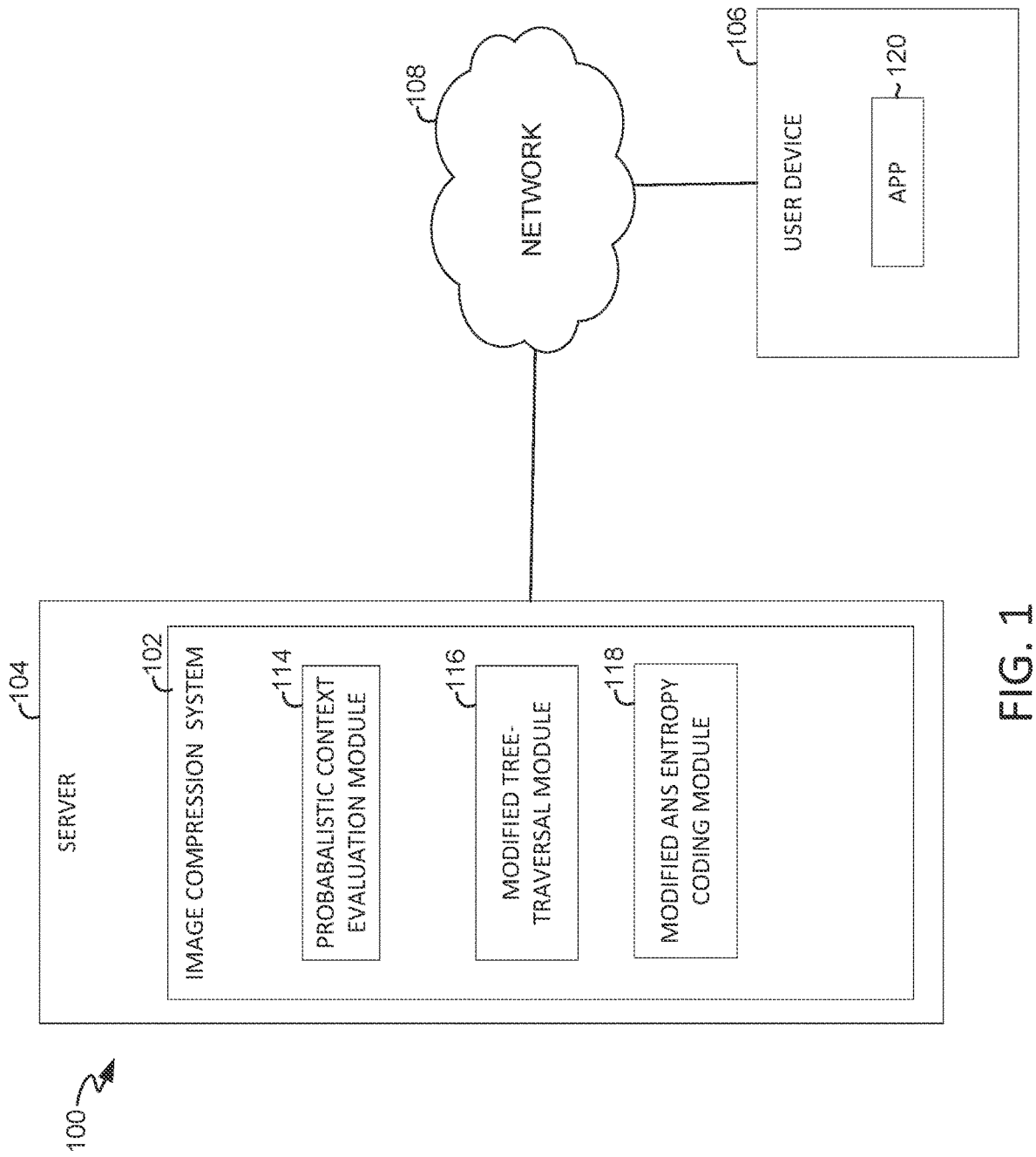
FIG. 1 is a diagram of an environment using an implementation of an image compression performance optimization module according to the present disclosure.

In the current era of big data, data is becoming more and more abundant. Conventional image compression algorithm can involve tremendous computational burden. Image compression is generally performed using lossy compression or lossless compression. Lossy image compression allows for some distortions in the decompressed data in exchange for a higher compression rate, while lossless image compression requires that there be no quality loss in the decompressed data. Lossless compression is particularly important in those applications where the original image content cannot be altered (e.g., to enable further processing, archiving etc.).

In conventional image compression systems, lossless compression algorithms include the steps of transforming the image, predicting the pixel value, context modeling, and entropy coding. In lossless and lossy compression, the pixel-value prediction process takes into account the difference between actual pixel values and the predicted pixel values. The pixel-value prediction process generally utilizes the surrounding pixels to predict the target pixel value.

The context modeling process takes the error in prediction (also called residuals) and clusters error values with similar statistical characteristics based on some context information derived from surrounding pixels. Context modeling in image compression algorithms, also known as error context modeling, builds or trains a model to cluster the residual for each pixel with respect to a context. The context model built using image compression systems can be in the form of a decision tree or any other model. Context modeling clusters residuals to different contexts in the decision tree to generate accurate probability estimations of the residual distributions in each context, thereby resulting in better compression efficiency. Context modeling is an important component in image compression systems. However, it is also an expensive component in terms of time and resource utilization costs. For example, in conventional image processing systems, properties of a pixel are used to index into a current decision tree to arrive at a leaf node. Properties are features associated with a pixel (for example, intensity level of the pixel, intensity level of the pixel above the pixel under consideration etc.). Features can be used to build the context. For example, pixels having an intensity level (one of the properties) above 50 belong to a same context. A context is a combination of those features that allows to group pixels that can be entropy coded together. For each leaf node in the decision tree, there is one actual context and multiple virtual contexts, one per each property. In one example, the actual context is used to encode the pixel residual and the virtual context stores two sub-contexts. For example, assuming there are three properties P1, P2, P3, all pixels with P1<x in this example (P1 could be an intensity value and x could be 100 for example) would get assigned to a particular leaf of a tree. These pixels are encoded using the "actual context," so that the pixels/residuals will be assigned to this leaf node to be encoded. However, if hypothetically the leaf is split according to P2 and P3, different virtual contexts are considered. For example, four virtual contexts: (1) P2<x1, (2) P2>x1, (3) P3<x2, (4) P3>x2 can be considered, where x1 and x2 are other thresholding values for property P2 and P3 respectively and can be used to split pixels or residuals into separate contexts. As such, virtual contexts are used when evaluating different situations of splitting the tree even further and evaluating the performance if the tree was split or further divided. Virtual contexts are not actual context because the leaf has not been actually split. A pixel is routed to one to one of them based on the corresponding property, and virtually encoded to compute a cost associated with each virtual context. In this regard, the encoding cost of further splitting the leaf node into two new leaf nodes is computed. Upon identifying one virtual context that yields lower compression bit cost than the actual context, the leaf node is converted into a decision node with two more leaf nodes, with the expectation that this approach yields an overall better compression ratio. However, such a process is time consuming and resource intensive in that every instance a pixel is processed during training of a decision tree, each virtual context is analyzed.

The trained decision tree includes leaves that correspond with the context where pixels should be encoded. Upon training the decision tree (where the context modeling is performed), the trained decision tree is generally traversed to identify a particular leaf node, or corresponding context, to which the particular pixel should be encoded. Each pixel or residual traverses or goes through the tree to find a corresponding context. Each residual is then entropy coded into each context. In one example, the tree navigation happens to find the corresponding entropy coder for each residual or pixel. Tree navigation is one of the most repeated operations during both encoding and decoding of pixels. For example, an image composed of millions of pixels can have a substantial impact on the execution time of such tree navigation. In conventional implementations, tree navigation for each pixel is performed for the entirety of the tree. In this regard, navigating the whole tree for each of the pixels results in a substantial impact on the execution time of encoding and/or decoding pixels of an image.

Further, entropy encoding, which is often the final step to encode the residuals, can also be time and resource intensive. For example, one conventional entropy encoding scheme is Huffman coding. Huffman coding implements table-lookup for unique prefix-free code for an input symbol. The prefix-free nature of the codes also allows for efficient decoding using a binary tree. The Huffman coder, however, can yield significantly suboptimal compression results, with as high as one bit per symbol higher than the theoretical entropy. Another conventional entropy encoding scheme includes arithmetic coding. Arithmetic coding can include an encoder that implicitly represents an entire input as a single state from an extensive finite-state machine. Such arithmetic coding, however, has slow compression speeds. Another conventional entropy encoding scheme includes a family of asymmetric numeral systems (ANS) that combines the compression ratio or arithmetic code with a processing speed similar to Huffman coding. However, using a symbol-based ANS in the coding process is impractical due to the high computational cost to maintain a cumulative probability table for all the symbols that is needed by the symbol-based ANS. Further, for adaptive encoding the probability table changes every time a new symbol (pixel residual) is encoded. As such, the cumulative probabilities are frequently updated, generally requiring an O(S) time complexity for every update, where S is the cardinality of the symbols.

As such, various aspects of image compression, including context modeling and entropy coding, result in computer intensive processing.

Accordingly, embodiments of the present disclosure facilitate efficient and effective image processing, thereby reducing the time and resource utilization used to perform image compression. In particular, some techniques of the present disclosure improve time and computational efficiency associated with encoding and/or decoding. To perform efficient and effective image compression, aspects related to an improved context modeling, tree traversal, and entropy coding are described herein. For example, and at a high level, as a large amount of time is spent training the decision tree, a probabilistic context evaluation module is described herein that is used to perform evaluations of certain virtual contexts of properties of a pixel in the image and determine whether to split each leaf node in the tree based on the evaluation. As such, processing time is reduced as not all virtual contexts are evaluated. The probabilistic context evaluation module can be used in any other model. Further, as image compression includes a large amount of time and processing to navigate a decision tree to find an appropriate leaf node or context that the pixel belongs in, a modified tree-traversal module is described herein that uses a binary mask, a speculative-based approach, and/or a machine learning approach for more efficient navigation of the tree. In particular, such approaches are based on a tendency of a pixel having similarity to, or sharing context with, a neighboring pixel(s). Such a modified tree-traversal module can be used to perform a more efficient encoding and/or decoding process. Yet further, to enhance efficiency associated with performing entropy coding, a modified ANS entropy coding module is described herein. The modified ANS entropy coding module generally implements a binary version of ANC coder to process symbols (e.g., mantissa-exponent represented symbols). Such techniques and modules are described in more detail below and with reference to the figures and corresponding descriptions. It should be understood that while some examples discuss the embodiments being used in a tree, the embodiments of the present disclosure or any of the methods or systems described herein can be applicable in any situation that includes a context.

Initially, in regard to the probabilistic context evaluation module, in operation, the probabilistic context evaluation module can be configured to generate or train a decision tree by analyzing a subset of virtual contexts in determining whether to split a leaf node based on a property. Advantageously, the compression time can be significantly reduced with minimal reduction of the compression ration based on the number of virtual contexts being evaluated. In a tree, the virtual contexts can be properties. For example, contexts (and therefore virtual contexts) are a combination of properties that allow to split pixels or residuals. In one example, if we have two properties P1 and P2, we can have 4 different contexts: 1. P1<x1 and P2<x2, 2. P1>x1 and P2<x2, 3. P1<x1 and P2>x2, 4. P1>x1 and P2>x2, where P1 and P2 can be predetermined and x1 and x2 are thresholding values that are learned per-image. In one example, when a pixel/residual arrives, the property values associated with it are known and they can be put in one of the four contexts listed above. The properties generally refer to a set of features associated with the pixel. Properties of the pixels are used to index into a tree to navigate to a leaf node. Each leaf node includes one actual context and multiple virtual contexts (one virtual context for one property of the pixel). In one example, the actual context encodes the pixel residual and the virtual context stores two sub-contexts. A pixel is navigated to one of the leaf node based on the pixel's property. As described above, in conventional image compression systems, when the pixel is routed to one of the leaf nodes based on the corresponding property, it is "virtually" encoded to compute an encoding cost associated with each virtual context. This means that the tree splitting encoding cost of further splitting the current node into two new leaf nodes is determined. When the image compression system finds one virtual context that yields lower compression bit tree splitting encoding cost than the actual context, the leaf node is converted into a decision node with two more leaf nodes, with the expectation that this approach can yield an overall better compression ratio. However, this means that every time a pixel is processed during training, all the virtual contexts are evaluated, which takes a significant amount of the time.

However, not all the virtual contexts are of equal importance. This means that not all virtual context have an equal chance to be chosen to split a leaf node. As such, the probabilistic context evaluation module obtains an encoding cost associated with each virtual context of the pixel and chooses a subset of virtual contexts to evaluate when processing a pixel. In one example, when a pixel or residual is encoded in a context (either actual or virtual), the number of bits or an approximate number of bits that will be needed to encode the stream of pixels/residuals can be determined. If a virtual context yields a lower number of bits, the tree can be split of divided in that case. The probability of each virtual context being chosen is inversely proportional to the encoding cost of that virtual context. In other words, the lower the encoding cost of the virtual context, the higher the chances it will be chosen for evaluation. The probabilistic context evaluation module can determine the subset of virtual contexts to evaluate. The encoding cost of each virtual context can be determined from the contexts and can be used by the probabilistic context evaluation module. This is the tree-splitting encoding cost for each virtual context. Based on the tree-splitting encoding cost, it can be determined whether to split the tree or not. For example, if a virtual context yields a lower compression bit cost than the actual context, then the leaf node with the actual context is split into two leaf nodes. In another example, a tree-splitting encoding cost can be determined for each virtual context and also the encoding cost of not splitting the tree (i.e. keeping the tree as it is currently). If any virtual context has a tree-splitting encoding cost that is lower than the encoding cost of not splitting the tree, then the leaf node can be split for the virtual context having the lowest tree splitting encoding cost. As such, the probabilistic context evaluation module can save on processing time by using only a portion of virtual contexts to evaluate.

Evaluating only a subset of the virtual contexts reduces the compression ratio as the evaluation of the virtual context is not performed in an exhaustive manner for each leaf node. Advantageously, the compression time is likely to be significantly reduced with minimal reduction of the compression ratio based on the number of virtual contexts in the subset. By setting different values of K (denoting the number of virtual contexts), the compression time can be tuned to satisfy different requirements of compute capability and time budget. In this regard, given a time budget, the value of K can be changed as the pixels are encoded in order to regulate compression time. For example, more time (i.e., higher K value) can be allocated to the early pixels to be encoded, as those pixels influence the top levels of the decision tree, which necessitates more accurate and precise evaluation. As the trees grows and the pixels are divided into finer cluster, the value of K can be decreased to allow for a quicker evaluation of the virtual contexts.

As described, generating or training a decision tree (e.g., using a probabilistic evaluation of virtual contexts) results in a decision tree that includes leaf nodes. Each leaf node represents a context where pixel can be encoded. As such, the tree is navigated for each pixel in order to encode the pixel in the correct or appropriate leaf node. Tree navigation is one of the most repeated operations during both encoding and decoding of the pixel. Given that an image is composed of millions of pixels, this navigation can have a substantial impact on the image compression execution time. The modified tree-traversal module provides a method to allow for faster navigation of the tree. The modified tree-traversal module can be used in decoding and/or encoding stages.

When navigating a decision tree, pixels with the same context generally end up in the same leaf node. In the image, neighboring pixels or pixels in close proximity to each other tend to exhibit similar characteristics and can therefore be clustered in the same context with a higher probability that they share the same context, depending on the image and its local characteristics. This proximate pixel similarity is used by the modified tree-traversal module to navigate through the tree in a more efficient manner. Advantageously, the modified tree-traversal module uses a process that maintains compression performance since pixels would still be clustered in the same context as in standard tree navigation.

In one example, the probabilistic context evaluation can be applied in any system or method where a context could be split into multiple ones based on the performance of the virtual contexts. For example, a context can include a plurality of nodes. Training a context using a probabilistic context evaluation method to determine whether to split each node in the context can include identifying a subset of virtual contexts to evaluate. Each virtual context in the properties subset indicates splitting of one or more nodes in the context features associated with each pixel. For example, each virtual context represents a different combinations of one or more nodes in the context being split. These virtual contexts represent how the context could potentially be split. An encoding cost of splitting of the tree context for each virtual context in the subset is obtained. The probabilistic context evaluation method determines whether to split each node in the context based on the encoding costs. For example, a node in the context is split when the corresponding encoding cost of the corresponding virtual context representing a split of the node is less than the encoding cost of not splitting the node in the context. For example, if a virtual context of splitting a node A in the context and a virtual context of splitting a node B in the subset are present and the encoding cost of the virtual context where node A is split is less than the encoding cost of not splitting the context or even less than the encoding cost of splitting node B, then it can be determined that the node A should be split. However, if encoding cost of splitting node A is less than encoding cost of splitting node B but is higher than encoding cost of the context as is (i.e. the context without any node splitting or not splitting any nodes in the context), then it can be determined that none of the nodes should be split.

In embodiments, the modified tree-traversal module allows the computer system to navigate a decision tree using context awareness. In one example, the modified tree-traversal module uses a binary mask that can be stored along with a corresponding pixel or the compressed data. The binary mask indicates whether the corresponding pixel shares context with a neighboring pixel. In one example, one or more pixels (neighboring or not neighboring) can be reviewed and determined whether the previous pixels share the same context as the corresponding pixel. In another example, a group of pixels (neighboring or not neighboring) are reviewed and determined whether the group of previous pixels same the same context as the corresponding pixel. The modified tree-traversal module can use the mask to determine whether to traverse the tree. Using a binary mask can result in one additional bit being added to each channel of the image. In another example, the modified tree-traversal module uses a speculative-based method to determine whether to traverse the tree. The modified tree-traversal module assumes that a pixel shares context with neighbors and navigates to the leaf node containing the previous pixel. In parallel, the modified tree-traversal module verifies the speculation. Multiple threads can be run in the background to verify each speculation for each pixel. If the speculation is inaccurate, the modified tree-traversal module goes back to the pixel with the incorrect assumption, navigates to the pixel to the leaf node, and restarts the speculative-based process. In another example, the modified tree-traversal module uses a machine learning (ML) algorithm(s) to determine whether to use the speculative-based method for navigating the tree. If the ML algorithm determines a region of an image has a higher probability of shared context, the ML algorithm may recommend using the speculative-based method for tree-traversal for that region.

In the speculative-based approach, in the worst case where all the speculations are incorrect, the decoding performance will be as good as the baseline (plus minimal overhead). If anytime the speculation is correct, the system can achieve an improvement in speed. Usually in images, a high percentage of the pixels share the same context not only spatially but also across channels. As such, the modified tree-traversal module can provide an improved speed during image processing.

In one example, a sliding window algorithm can be used to control the "committed" pixels that are decoded and verified, "in-flight" pixels that are decoded and being verified, and "future" pixels that are not decoded yet. The size of the window can be determined by the number of CPUs available on the host and the average "distance" (number of pixels) between a context change of the image that can be obtained during the encoding time. To minimize the thread creation overhead, a thread pool can be created in the beginning and the main thread can start decoding and launch tasks to traverse the tree and verify the context. If the verification fails, the thread can inform the main thread by setting a flag. Upon checking the flag, the main thread can pause and roll back to the point of the first failure and, thereafter, restart the decoding with the correct context by resetting the current pixel positions and the impressed file pointer position.

In some embodiments, when the Y channel of color space (representing the luma, or intensity, component) is being decoded, the decoder can speculatively choose the context of pixel to be the same with the previous pixel. For Co and Cg channels of a color space (representing two chrominance components orange and green), the decoder can speculatively choose the context based on the pixel in Y channel.

During the entropy coding phase, entropy coding is performed to encode and/or decode digital data. Entropy encoding is commonly used as a final step (after context modeling is performed) to encode residuals. Entropy decoding is performed when decoding images and is performed in the beginning of the decompression process. As described, asymmetric numeral systems (ANS) is one conventional entropy coding algorithm that combines the compression ratio of arithmetic coding with a processing speed similar to Huffman coding. ANS coders provide a trade-off between Huffman coders and Arithmetic coders. The ANS coders result in slightly lower compression ratio compared to Arithmetic encoding but comparable compression speed compared to Huffman encoding. However, ANS coders provide a high computational cost to maintain a cumulative probability table for all the symbols that are needed by the symbol-based ANS. In adaptive encoding, the probability table can change every time a new symbol (pixel residual) is encoded, thereby resulting in an increase in computing time and resources.

To avoid performing a more expensive operation, the modified ANS entropy coding module generally refers to a coder that uses binary coding instead of a symbol-based coding, where a symbol is interpreted as an array of bits, and each bit is encoded with a separate probability table. For example, a symbol is a value that needs to be encoded, for example a residual. In one example, a symbol 5 can be represented as 0101. Therefore the symbol 0, 1, 0, 1 are then encoded, each using a separate ANS with separate probability tables. Other ways to represent the symbols and process through ANS can be used. For example, one or more symbols can be processed by one ANS encoder. Using a binary coding allows the modified ANS entropy coding module to process each symbol in O (log(S)) time, which can be faster than an ANS encoding that uses symbols rather than bits. In one example, the modified ANS entropy coder interprets a symbol from its ordinary binary representation to a mantissa-exponent representation so that the probability of each bit can be better estimated. It should be understood that the modified ANS entropy coder can interpret a symbol from its binary representation in other ways as well.

Additionally, the modified ANS entropy coding module uses multiple encoders to process the converted data in parallel. The modified ANS entropy coding module combines the result of the coders into a data range.

As described herein, a combination of these techniques may facilitate the image processing algorithm to perform image compression in a more efficient and effective manner. A combination of these techniques can allow the users to set a time threshold or budget so that the image processing algorithm will do a best-effort compression within the given latency limit. This may also facilitate the image processing algorithm to adapt to devices with different computation capabilities. A combination of the techniques described herein may allow for faster and tunable image compression with minimum loss of compression ratio. As can be appreciated, any combination of these techniques described herein may be implemented, including using only a single technique to implement embodiments described herein.

Exemplary Environments for Facilitating Image Compression Performance Optimization Turning to FIG. 1, FIG. 1 is a diagram of an environment using an implementation of image compression performance optimization system according to the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 11.

The system 100 is an example of a suitable architecture for implementing certain aspects of the present disclosure. In one embodiment, the system 100 includes, among other components not shown, an image compression system 102, a server 104, and a user device 106. Each of the image compression system 102, server 104, and user device 106 shown in FIG. 1 can comprise one or more computer devices, such as the computing device 1100 of FIG. 11, discussed below. As shown in FIG. 1, the image compression system 102, the server 104, and the user device 106 can communicate via a network 108, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present disclosure. Each may comprise a single device or multiple devices cooperating in a distributed environment. For instance, the image compression system 102 could be provided by multiple devices collectively providing the functionality of the image compression system 102 as described herein. Additionally, other components not shown may also be included within the network environment.

It should be understood that any number of user devices, servers, and other components may be employed within the operating environment 100 within the scope of the present disclosure. Each may comprise a single device or multiple devices cooperating in a distributed environment.

User device 106 can be any type of computing device capable of being operated by a user. For example, in some implementations, user device 106 is the type of computing device described in relation to FIG. 11. By way of example and not limitation, a user device 106 may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 106 can include one or more processors, and one or more computer-readable media. The computer-readable media may include computer-readable instructions executable by the one or more processors. The instructions may be embodied by one or more applications, such as application 120 shown in FIG. 1. Application 120 is referred to as a single application for simplicity, but its functionality can be embodied by one or more applications in practice. As indicated above, the other user devices can include one or more applications similar to application 120.

The application(s) may generally be any application capable of facilitating image compression performance optimization (e.g., via the exchange of information between the user devices and the server 104). In some implementations, the application(s) comprises a web application, which can run in a web browser, and could be hosted at least partially on the server-side of environment 100. In addition, or instead, the application(s) can comprise a dedicated application, such as an application having image processing functionality. In some cases, the application is integrated into the operating system (e.g., as a service). It is therefore contemplated herein that "application" be interpreted broadly.

In accordance with embodiments herein, the application 120 can facilitate image compression performance optimization via a set of operations initiated, for example, based on a user selection. In embodiments, images can be selected that will be processed using the image compression performance optimization. In some embodiments, the application 120 can initiate multiple operations to effectuate image compression performance optimization during image processing. In operation, a user can provide an image to process. The application 120 can use the image compression system 102 to process the image. The image compression system 102 can use one or more of the following modules: the probabilistic context evaluation module 114, the modified tree-traversal module 116, and the modified ANS entropy coding module 118.

In operation, the probabilistic context evaluation module 114, when initiated, can be used to probabilistically evaluate properties or virtual context of pixels. At a high level, the probabilistic context evaluation module 114 can obtain an encoding cost to each property of the pixel and determines only a subset of virtual contexts to evaluate or use while building the tree for a particular leaf. The encoding cost can be obtained from the context that provides the cost of encoding a pixel or residual in the particular context. The encoding cost is for each virtual context. The context can be defined for a specific combination of properties. The probabilistic context evaluation module 114 determines an encoding cost of each virtual context in the subset and determines based on the encoding cost whether to split the tree or not. As such, the modified-context modeling module facilitates efficient and effective training of a decision tree.

The modified tree-traversal module 116, when initiated, navigates the tree using context awareness. In particular, the modified tree-traversal module 116 facilitates a more efficient and effective tree navigation for pixels using an approach based on similarity of neighboring or nearby pixels. In one example, the modified tree-traversal uses a binary mask that indicates whether the corresponding pixel shares context with a neighboring pixel. The modified tree-traversal module 116 can use the binary mask to determine whether to traverse the tree. In another example, the modified tree-traversal module uses a speculative-based method to determine whether to traverse the tree. The modified tree-traversal module 116 speculates by assuming that a pixel shares context with neighbors and does not traverse the tree. The modified tree-traversal module 116 verifies the speculation in parallel. If the speculation is inaccurate, the modified tree-traversal module 116 goes back to the pixel to fix the incorrect assumption and restarts the process with the next pixel. In another example, the modified tree-traversal module uses machine learning (ML) algorithms to determine whether to use the speculative-based method for navigating the tree. If the ML algorithm determines a region of an image has a higher probability of shared context, the ML algorithm may recommend using the speculative-based method for tree-traversal for that region.

The modified ANS entropy coding module 118 performs a modified entropy coding to entropy code data. The modified ANS entropy coding module 118 converts data into a binary representation and uses multiple encoders to process the converted data in parallel. The modified ANS entropy coding module combines the result of the coders into a data range.

As described herein, server 104 can facilitate image processing using the probabilistic context evaluation module 114, the modified tree-traversal module 116, and the modified ANS entropy coding module 118. Server 104 includes one or more processors, and one or more computer-readable media. The computer-readable media includes computer-readable instructions executable by the one or more processors. The instructions may optionally implement one or more components of the probabilistic context evaluation module 114, the modified tree-traversal module 116, and the modified ANS entropy coding module 118 as described in additional detail herein.

For cloud-based implementations, the instructions on server 104 may implement one or more components of the probabilistic context evaluation module 114, the modified tree-traversal module 116, and the modified ANS entropy coding module 118, and application 120 may be utilized by a user to interface with the functionality implemented on server(s) 104. In some cases, application 120 comprises a web browser. In other cases, server 104 may not be required. For example, the components of the probabilistic context evaluation module 114, the modified tree-traversal module 116, and the modified ANS entropy coding module 118 may be implemented completely on a user device, such as user device 102. In this case, the probabilistic context evaluation module 114, the modified tree-traversal module 116, and the modified ANS entropy coding module 118 may be embodied at least partially by the instructions corresponding to application 120.

Thus, it should be appreciated that the probabilistic context evaluation module 114, the modified tree-traversal module 116, and the modified ANS entropy coding module 118 may be provided via multiple devices arranged in a distributed environment that collectively provide the functionality described herein. Additionally, other components not shown may also be included within the distributed environment. In addition, or instead, the probabilistic context evaluation module 114, the modified tree-traversal module 116, and the modified ANS entropy coding module 118 can be integrated, at least partially, into a user device, such as user device 106. Furthermore, the probabilistic context evaluation module 114, the modified tree-traversal module 116, and the modified ANS entropy coding module 118 may at least partially be embodied as a cloud computing service.

These components may be in addition to other components that provide further additional functions beyond the features described herein. The image compression system 102 can be implemented using one or more devices, one or more platforms with corresponding application programming interfaces, cloud infrastructure, and the like. While the image compression system 102 is shown separate from the user device 106 in the configuration of FIG. 1, it should be understood that in other configurations, some or all of the functions of the image compression system 102 can be provided on the user device 106.

Exemplary Image Processing System

Figure 2:
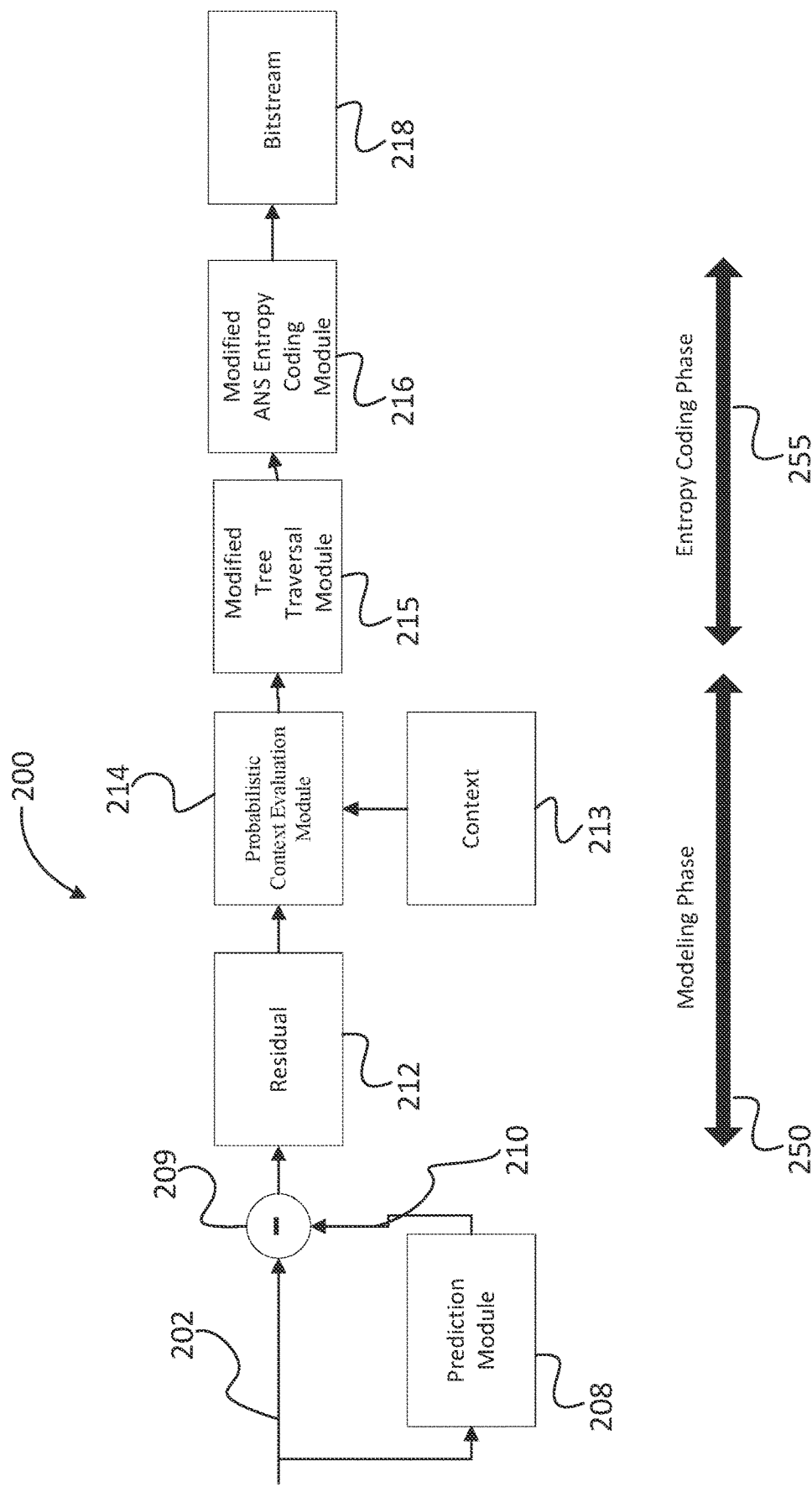
FIG. 2 illustrates a block diagram of an exemplary image processing system in accordance with embodiments described herein.

FIG. 2 illustrates a block diagram of an exemplary image processing system 200 in accordance with embodiments described herein. The image processing system 200 can be suitable for image processing that involves image compression. In one example, the image processing system 200 uses an image compression that is based on, or uses, Free Lossless Image Format (FLIF).

With further reference to FIG. 2, the image processing system 200 receives or obtains image data 202. The exemplary image compression system 300 initially transforms the data to prepare it for the modeling phase 250. For example, the color space of the received image data is transformed from a Red, Green, Blue (RGB) color model to a Luma (Y), Chrominance Green (Cg), Chrominance Orange (Co) (YCoCg) color model for better color decorrelation. In one example, the modeling phase 250 can include of the residual 212, the probabilistic context evaluation module 214, and the context 213. In one example, the entropy coding phase 255 can include the modified tree traversal module 215 and the modified ANS entropy coding module 216.

During the modeling phase 250, the image processing system 200 uses a prediction module 208 to make predictions for each pixel. For example, for each pixel, the prediction module 308 uses the surrounding pixels to predict a pixel value 210. For instance, to predict a pixel value for a pixel, the prediction module determines the median of surrounding values. The image processing system 200 determines the difference 209 between the predicted pixel values 210 and the actual pixel value 202. In image compression systems 200, these differences 209 are called the residual values 212.

In one embodiment, during encoding of images, the image processing system 200 in the modeling phase 250 uses a probabilistic context evaluation module 214. The probabilistic context evaluation module 214 is generally configured to build or train a context model. Advantageously, and as described herein, the probabilistic context evaluation module 214 enables a faster or more efficient training or building of a context model (as compared to conventional implementations). As described, the context model is generally in the form of a decision tree.

During training of the context model, the probabilistic context evaluation module 214 performs evaluations on virtual contexts associated with a leaf to determine whether to split the leaf node in the tree which can result in a better compression performance. In one example, only a subset is evaluated. This subset can be determined by ordering the virtual contexts based on the inverse of their encoding cost. The lower encoding cost can mean better context higher probability. Lower encoding cost can entail a better performance and, therefore, a higher probability that a virtual context is picked for evaluation. In one example, the probabilistic context evaluation module 214 does the evaluation by obtaining an encoding cost for each property of the pixel. For example, based on the cost of pixel #99, the virtual contexts for pixel #100 which will be evaluated can be determined. Pixel #100 can then be encoded and a new set of costs for other virtual contexts can be obtained. In one example, based on the encoding costs and other factors, it can be determined whether to split the tree. When pixel #101 arrives in the leaf node, the cost values computed with pixel #100 can be used to decide which contexts to evaluate. Based on the encoding cost, the probabilistic context evaluation model 214 selects a subset of properties to evaluate. For example, the probability of each virtual context being chosen is inversely proportional to the encoding cost of that virtual context. In other words, the lower the encoding cost the virtual context, the higher the chances it will be chosen for evaluation. The probabilistic context evaluation module 214 determines an encoding cost of each property in the subset and determines based on the encoding cost whether to split each leaf node in the tree. The probabilistic context evaluation module obtains the encoding cost of splitting the tree for each property in the subset and determines which contexts to evaluate. This is the tree splitting encoding cost for each property. Based on the tree splitting encoding cost, the probabilistic context evaluation module decides whether to split the tree or not. For example, if a property or a virtual context yields a lower compression bit cost than the actual context, then the leaf node with the actual context is split into two leaf nodes. In another example, the probabilistic context evaluation module calculates a tree splitting encoding cost for each property and also the encoding cost of not splitting the tree (i.e. keeping the tree as it is currently). If any property has a tree splitting encoding cost that is lower than the encoding cost of not splitting the tree, then the probabilistic context evaluation module will split the leaf node for the property having the lowest tree splitting encoding cost. As such, the probabilistic context evaluation module can save on processing time by using only a portion of properties or virtual contexts to evaluate. As such, the probabilistic context evaluation module 214 can save on processing time by using only a portion of properties to evaluate.

In one embodiment, the image processing system 200 in the entropy coding phase 255 uses a modified tree-traversal module 215 to navigate the tree using context awareness. In one embodiment, the modified tree-traversal module 215 uses a binary mask that has been encoded along with a corresponding pixel. The binary mask that indicates whether the pixel shares context with the neighboring pixel. When the binary mask is read, the modified tree-traversal module 215 can determine whether to traverse the tree. For example, if the binary mask indicates the pixel has similar context as the previous pixel, the modified tree-traversal module 215 will place the pixel straight in the leaf node as the previous pixel and not navigate the tree. In another embodiment, the modified tree-traversal module 215 uses a speculative-based method to determine whether to traverse the tree. The modified tree-traversal module 215 speculates and then verifies the speculation in parallel. If the speculation is inaccurate, the modified tree-traversal module 215 rolls back to the pixel with the incorrect assumption and restarts the process. In another example, the modified tree-traversal module 215 uses machine learning (ML) algorithms to determine whether to use speculative-based method to tree-traversal. If the ML algorithm determines a region of an image has a high probability to share context, the ML algorithm will recommend speculative-based method to tree-traversal for that region.

In one embodiment, the image compression system 200 during the entropy coding phase 255 uses a modified ANS entropy coding module 216 to entropy code the decision tree. The modified ANS entropy coding module 216 converts the data into a binary representation and uses multiple encoders to process the converted data. The modified ANS entropy coding module 216 combines the result of the coders into a data range and provides that to the bitstream 218 where the image data can travel through a channel.

It should be understood that any components described herein in the image processing system 200 can be used during an encoding or decoding process.

Figure 3:
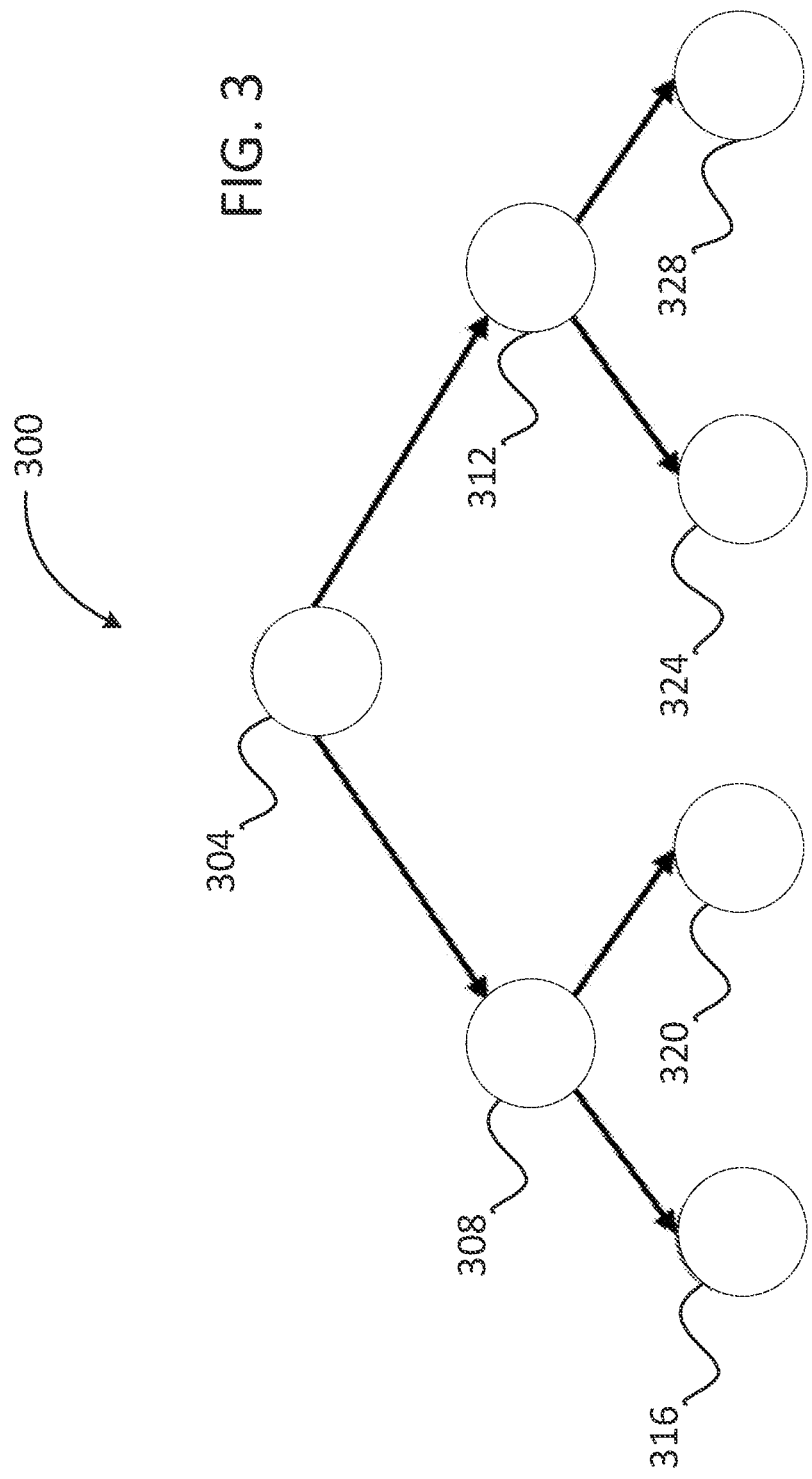
FIG. 3 is an exemplary tree for implementing aspects of the technology described herein.

Exemplary Implementations for Modified Tree-Traversal Using Context-Aware Traversing FIG. 3 illustrates an exemplary tree 300 for implementing aspects of the technology described herein. In some systems, a tree or a model 300 is built to determine where data should be encoded. Navigating the tree 300 can be a repeated operation both during encoding and decoding of the data. For example in an image processing algorithm, during context modeling, a decision-tree 300 is built to encode residuals together. In one example, the context modeling provides a decision tree 300 whose leaf nodes 316, 320, 324, 328 correspond with contexts to which pixels may be encoded and decision nodes 304, 308, and 312 can be used to navigate the pixels to the leaf nodes 316, 320, 324, 328. Pixels can be navigated through the tree 300 based on properties associated with the pixels. Since images are composed of millions of pixels, navigating through every decision node and leaf node can have a substantial impact on the execution time in encoding and decoding. It should be understood that while a tree is illustrated as tree 300, any possible tree 300 that requires traversing can be used.

Figure 4:
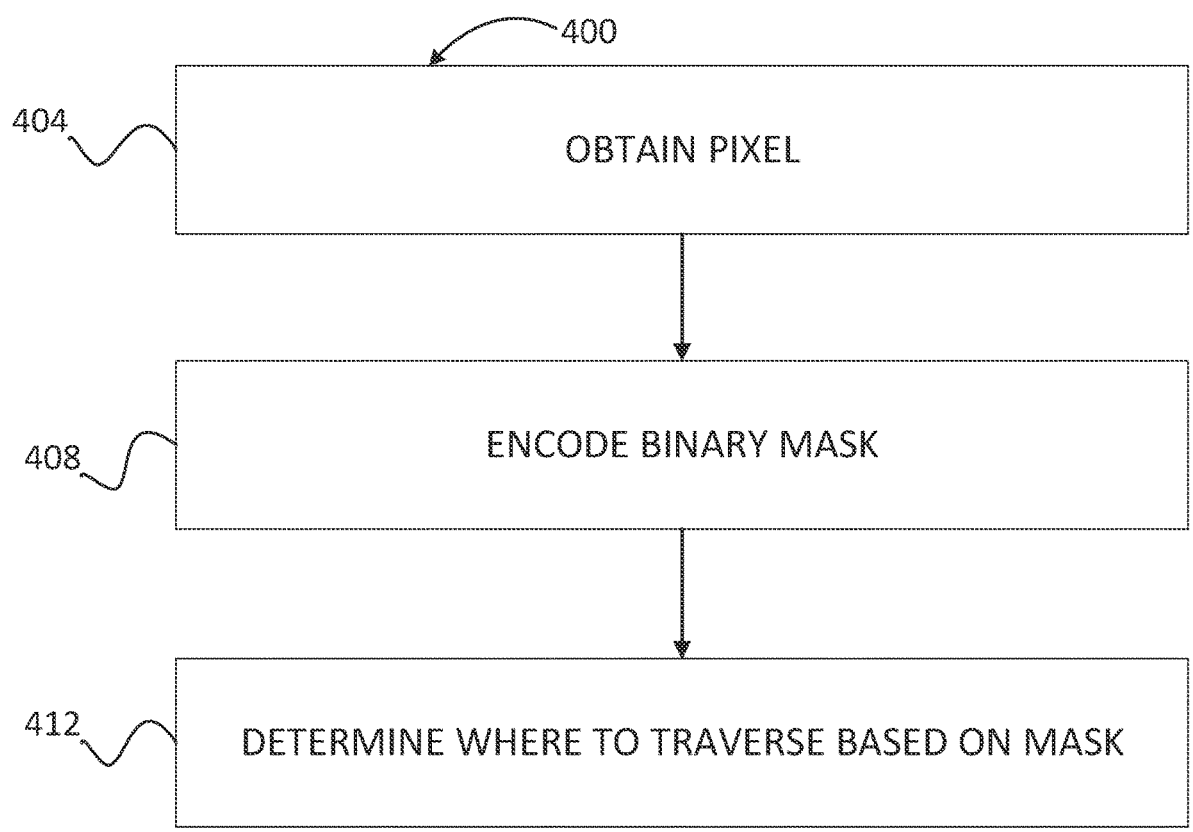
FIG. 4 is a flow diagram of a first exemplary modified tree-traversal method in accordance with embodiments described herein.

FIG. 4 is a flow diagram of a first exemplary modified tree-traversal method 400 using context-aware traversing in accordance with embodiments described herein. The modified tree-traversal method 400 can be performed by a computer device, such as device 1100 described below or a modified tree-traversal module 215. The flow diagram represented in FIG. 4 is intended to be exemplary in nature and not limiting. In one example, after a tree 300 is built, the modified tree-traversal method 400 can traverse the tree 300 to locate to the correct or appropriate leaf node 316, 320, 324, 328 for pixels in a more efficient manner than conventional image processing algorithms. The modified tree-traversal method 400 enables traversing the tree 300 using a context-aware approach to get to the appropriate context and save a portion of processing time such as the encoding or decoding time. The modified tree-traversal method 400 saves a portion of the processing time because it avoids navigating the whole tree 300 for many pixels in the image and uses context-sharing properties of the pixels (i.e. some pixels sharing same context as other pixels) such that the tree is not navigated from the root node to a leaf node for each pixel. This method 400 may allow for less compression performance cost since pixels will may be clustered in the same context as in standard tree navigation.

With continued reference to FIG. 4, the method 400 obtains data (Step 404). For example, pixels of an image are obtained. The method 400 evaluates the data and encodes a mask (Step 408). For example, a pixel is evaluated and a mask associated with the pixel is encoded. The mask can be encoded with information about the corresponding pixel. For example, the mask might provide information about the context of the corresponding pixel. For example, the mask might provide information such as whether the corresponding pixel has similar context as another pixel, a previous pixel, or a neighboring pixel. In one example, a binary mask is used to indicate whether its corresponding pixel has the same context as a previous pixel or a neighboring pixel. The binary mask can be stored alongside the corresponding pixel or it may be stored anywhere else in the data stream.

The method 400 determines where to traverse based on the mask data (Step 412). For example, during processing, this mask can be used to infer information about the data and determine where to traverse. In one example, if the binary mask indicates that the pixel has similar context as the previous pixel, the method 400 can determine which leaf node 316, 320, 324, 328 to traverse to, based on the previous pixel's leaf node 316, 320, 324, 328.

Figure 5:
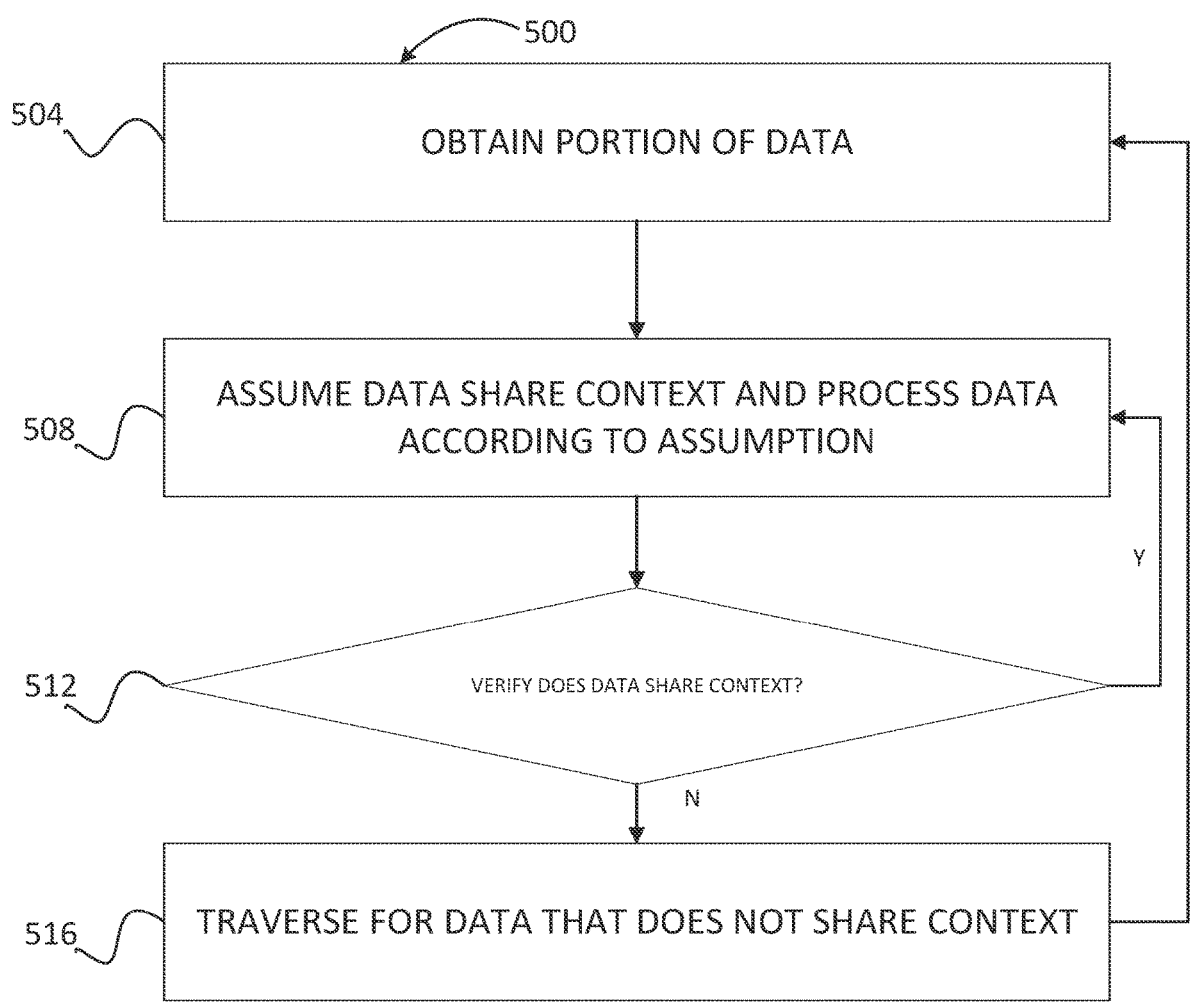
FIG. 5 is a flow diagram of a second exemplary modified tree-traversal method in accordance with embodiments described herein.

FIG. 5 is a flow diagram of a second exemplary modified tree-traversal method 500 in accordance with embodiments described herein. The modified tree-traversal method 500 can be performed by a computer device, such as device 1100 described below. The flow diagram represented in FIG. 5 is intended to be exemplary in nature and not limiting. Method 500 uses a speculative-based approach to tree traverse. This speculative-based method facilitates compression efficiency since in the speculative-based approach to tree-traversal, a lesser amount of masks can be stored.

With further reference to FIG. 5, the method 500 obtains a portion of data (Step 504). For example, during decoding, a portion of the data is obtained (Step 504). If the method 500 evaluates a portion of data at a time, then the method 500 speculates or assumes that all the pixels in the data share the same context as the previous pixel and the method 500 continues to decode speculatively. For example, it can be assumed that a set of pixels #10-#15 belong to the same context as pixel #9. It is assumed that one or more pixels belong to the same context as the previous pixel and they are accordingly decoded, a value is obtained. The value can be wrong if the context is not the same based on an incorrect assumption. (Step 508). If the method 500 evaluates each pixel at a time, then the method 500 speculates that the pixel shares the same context as the previous pixel, a neighboring pixel, or another pixel and continues to decode speculatively. In one example, by decoding speculatively, the method assumes that the pixel belongs to a certain context. The method uses this assumption or speculation to continue executing the method. When the method determines it is wrong, it can trace and redo the calculation. (Step 508).

The method 500 (e.g., in parallel) verifies whether the assumption was correct that was assumed in step 508. In one example, the method navigates the tree in parallel to verify whether the pixel belongs to that context and as a result whether the assumption was correct or accurate. (Step 512). If the assumption is correct (i.e. pixels share context), the method 500 continues to process the data in step 508 and traversed with the assumption. In one example, if the assumption is correct, the method continues to process additional pixels. If the assumption is incorrect, the method 500 will roll back to the pixel where the incorrect assumption was made and restart the encoding or decoding process. In one example, if the method has assumed that #10, #11, #12 share the same context as pixel #9 and has decoded the pixels #10, #11, #12 accordingly and in parallel verifies that the assumption is incorrect, the method will go back to pixel #10 and obtain the right context and decode the pixel #10 with the right context. (Step 516). This can involve navigating the whole tree 300 again, or can involve encoding or updating a mask corresponding to the pixel associated with an incorrect assumption. The method 500 can perform step 512 in parallel or the in the background using a backroad thread. In one example, the method performs step 512 parallel to the speculative decoding of the pixels where the method assumes the pixels share the same context. To minimize the background thread creation overhead for each verification, a thread pool can be created in the beginning. In one example, a main thread can pause and roll back or return to the point or pixel of the first incorrect assumption and restart decoding with the correct context by resetting the current pixel positions and the file pointer position. In one example, the method tosses away all the speculative computation and resets to the position of the last correct pixel. In one example, if the method has assumed that #10, #11, #12 share the same context as pixel #9 and has decoded the pixels #10, #11, #12 accordingly and in parallel verifies that the assumption is incorrect, the method would restart computation from pixel #9.

In one example, a sliding window algorithm can be used to control the pixels that have been decoded and verified (i.e. committed pixels), pixels that are decoded and being verified (i.e. in-flight pixels), and pixels that have not been decoded yet (i.e. future pixels). In one example, the method may speculatively decode a subset of pixels together and in the parallel verify whether the assumption that they belong together is correct or incorrect. The pixels in the subset can be either neighboring pixels or can by any pixels. The size of the window can be determined by different factors, such the number of processors or CPUs available on the host, the average distance (number of pixels) between context change of the image, the type of data that includes a higher or lower amount of pixels sharing the same context, or the like, or a combination. The average distance (number of pixels) between context changes of the image can be obtained during encoding. In one example, during encoding, it can be determined how often a context change occurs. For example, context may change every 5 pixels on average. This means that more than 5 pixels are considered at the time in the speculative execution, the assumption can be wrong since on average after 5 pixels, the context is likely to change. In another example, when a color channel (for example the Y channel) is being decoded, the decoder will speculatively choose the context of pixel to be the same with the previous pixel. For the other channels, (for example the Co and Cg channels), the decoder will speculatively choose the context based on the pixel in previous (in this case the Y) channel.

In method 500, if all the speculations or assumptions are wrong, then the decoding performance may be as good as the baseline with a minimal overhead. In one example, the overhead can be computational overhead since multiple operations are being performed at the same time due to speculative execution and verifying the speculative execution. The speculative execution refers to assuming one or more pixels share the same context as an already decoded pixel. It can also refer to decoding the assumed pixels according to the assumption. If a speculation or assumption is correct while using method 500, there may be a benefit of processing time. If a higher percentage of pixels share the same context, for example spatially or across channels or both, there could be a greater benefit in processing time in using method 500.

Figure 6:
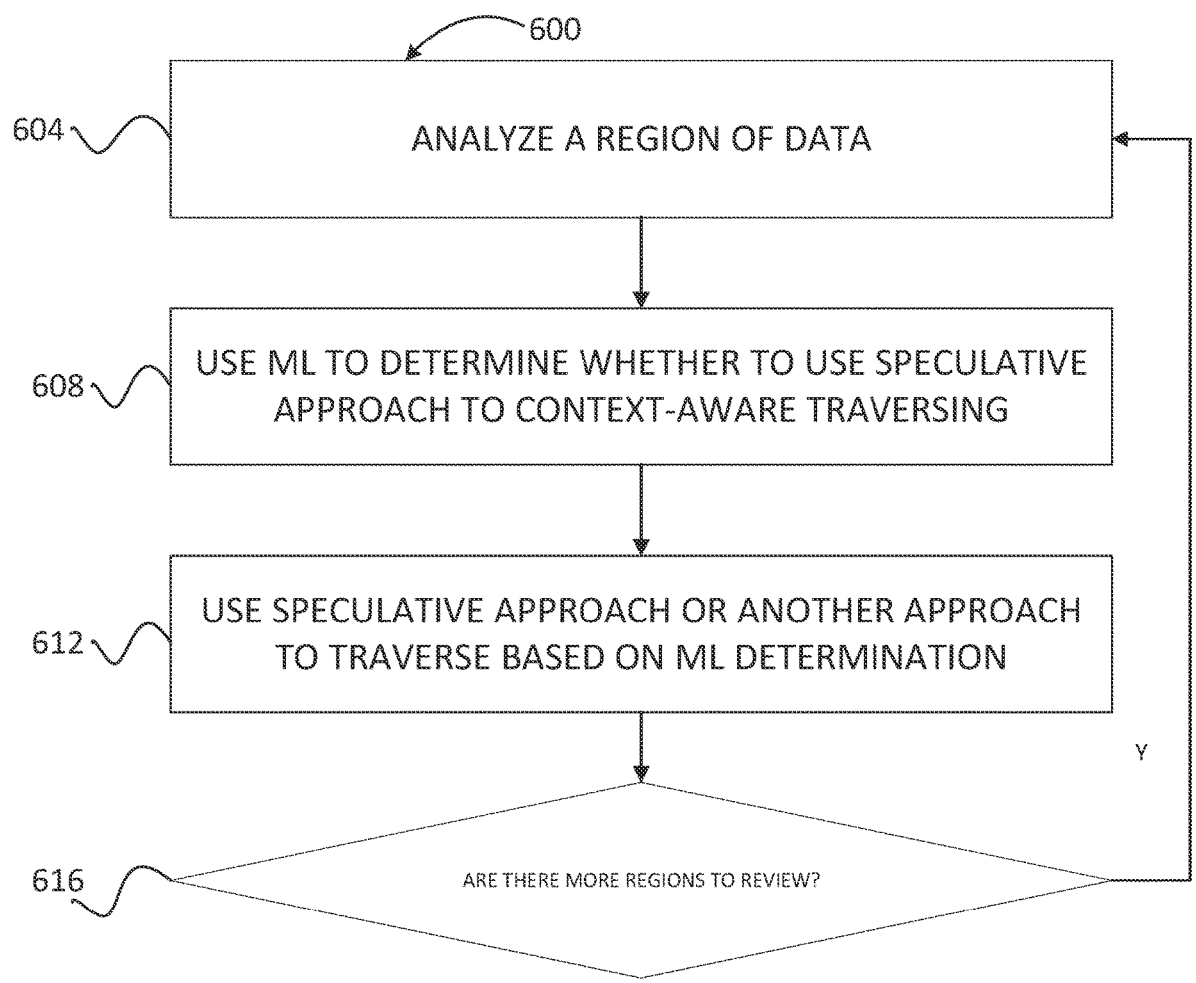
FIG. 6 is a flow diagram of a third exemplary modified tree-traversal method in accordance with embodiments described herein.

FIG. 6 is a flow diagram of a third exemplary modified tree-traversal method 600 in accordance with embodiments described herein. The modified tree-traversal method 600 can be performed by a computer device, such as device 1100 described below. The flow diagram represented in FIG. 6 is intended to be exemplary in nature and not limiting. In method 600, a machine learning (ML) algorithm can be used to assist in modified tree-traversal. In one example, the values of the pixels before the pixel being analyzed to train a model can be used to determine whether the pixel analyzed is likely to share the same context. Method 600 can use ML to analyze the data and determine regions in the data where the speculative-based method to tree-traversal 500 can be more useful. For example, the ML method 600 can analyze images and determine regions in the image that share the same context and where the speculative-based method to tree-traversal 500 should be performed. In one example, the ML method 600 can review multiple images that are similar and use information from previous images to determine where the speculative-based method to tree-traversal 500 should be performed.

With further reference to FIG. 6, the method 600 analyzes a region of data (Step 604). The region could be blocks of data, a semantic region, or the like. The method 600 uses a ML algorithm to observe the region of data and determine whether the speculative-based method to tree-traversal 500 should be performed on the region (Step 608). In one example, some ML algorithms that can be used are decision trees, neural networks or the like. Any suitable ML algorithm can be used. In one example, the method 600 can analyze a region and recommend sub-regions of data in that region where the speculative-based method to tree-traversal 500 will be more useful. In another example, the method 600 can rank the regions or can rank sub-regions in the regions based on the similarity of context or the cost of performing speculative-based method to tree-traversal 500. It should be understood that a combination of parameters can be used to rank the regions or can rank sub-regions in the regions. Based on this information, the method 600 will either use the speculative-based method to tree-traversal (method 500), traverse the tree without any speculation, traverse the tree using masks (method 400), or another method (Step 612). The method 600 verifies if there are other regions in the data to review (Step 616).

In another example, the ML algorithm can be used in conjunction with the speculative-based method to tree-traversal 500. For example, when the method 500 is performing the speculative-based method to tree-traversal 500, the method 500 uses ML to determine whether to speculate for a sub-region based on ML analysis of the sub-region.

Exemplary Implementations for Modified ANS Entropy Coding

During the encoding process, an entropy coder 316 is used sometimes as the final step to encode residuals and/or other data such as metadata. Some systems use Huffman coding, Arithmetic coding, or Asymmetric Numeral System (ANS) coding to entropy code. In Huffman coding, the image compression process performs a table-lookup for the unique prefix-free code for the input symbol that can allow for decoding using a binary tree. Conventional Huffman coders yield undesirable compression results. Arithmetic coding represents the entire input as a single state from a finite-state machine. Conventional arithmetic coding may be optimal in terms of its compression. However conventional arithmetic coding may have slower compression speeds.

ANS entropy coding combines the compression ratio of Arithmetic coding with a processing speed similar to Huffman coding. However, systems using conventional ANS observe a higher computational cost. This occurs, for example, due to maintaining a cumulative probability table for all the symbols that is needed by the symbol-based ANS. In systems that perform adaptive encoding, the probability table can change every time a new symbol (such as a pixel residual) is encoded. In such cases, the cumulative probabilities may have to be updated. Updating the cumulative probabilities can involve O(S) time complexity for each update, where S is the cardinality of the symbols. In one example, the cumulative probability is the probability of each symbol and O(S) is a notation to indicate the speed performance of an algorithm. The modified entropy coding described herein uses a modified ANS technique to entropy code.

Figure 7:
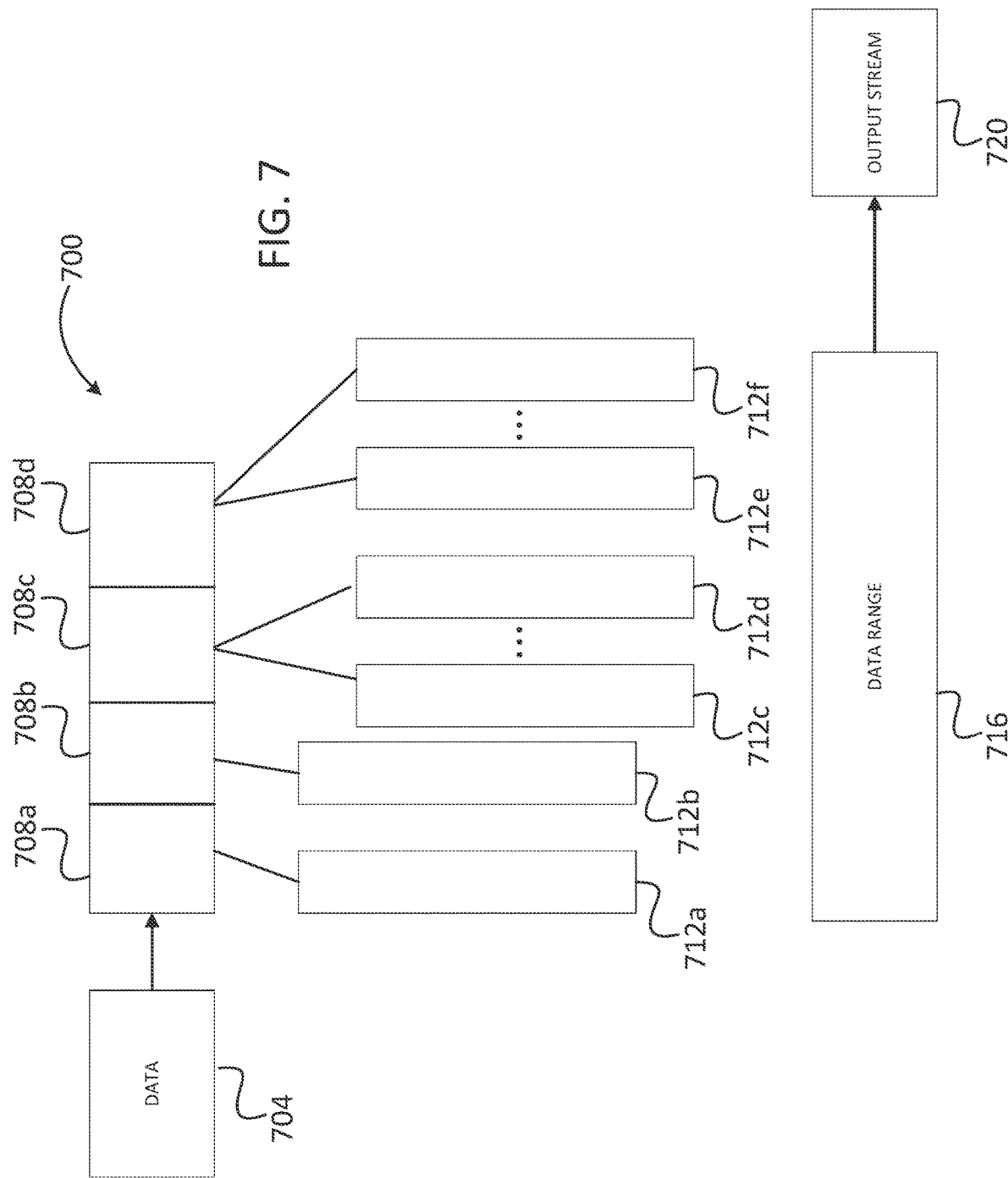
FIG. 7 is a block diagram of a system for implementing aspects of the modified ANS entropy coding described herein.
Figure 8:
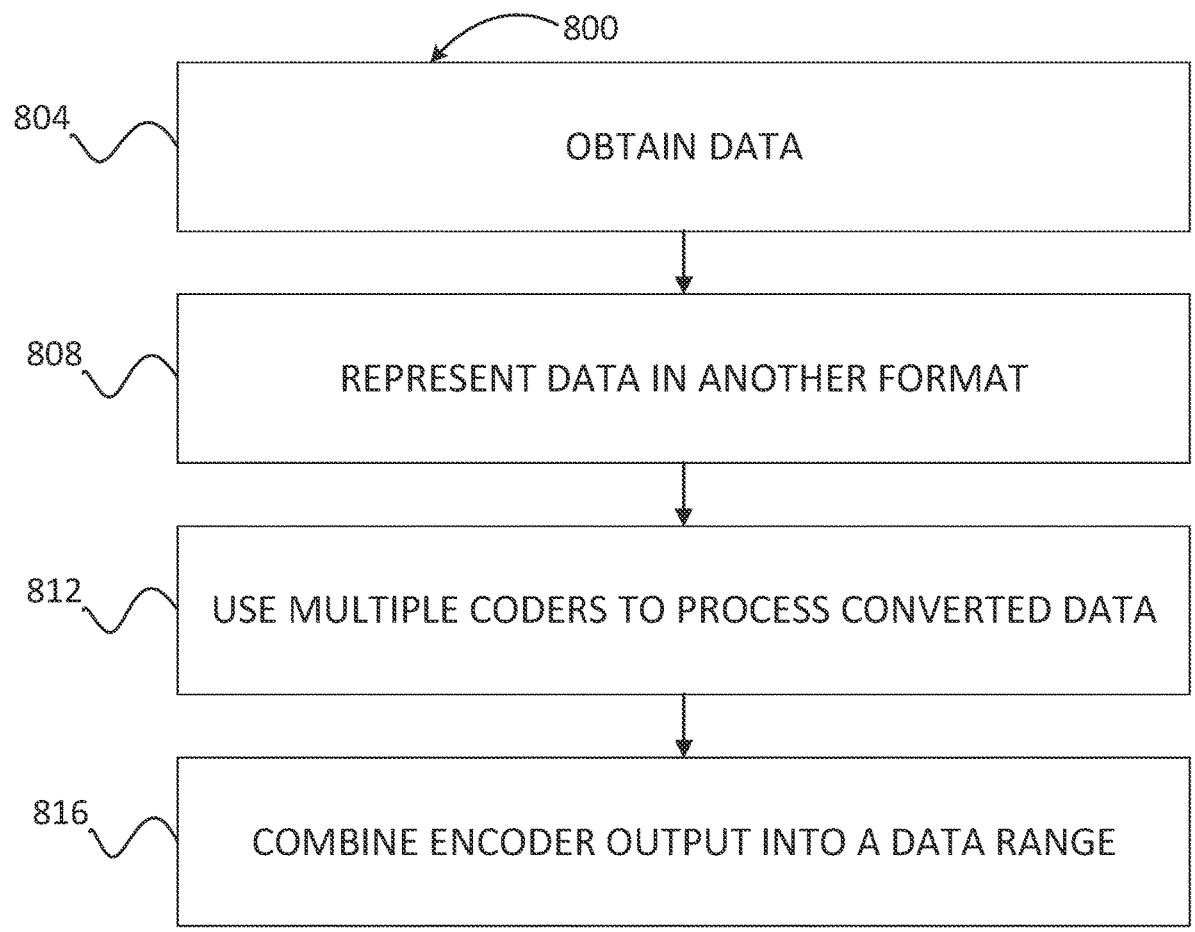
FIG. 8 is a flow diagram of an exemplary modified ANS entropy coding method in accordance with embodiments described herein.

With references to FIG. 7 and FIG. 8, FIG. 7 is a block diagram of a system 700 for implementing aspects of the modified ANS entropy coding described herein, and FIG. 8 is a flow diagram of an exemplary modified ANS entropy coding method 800 in accordance with embodiments described herein. The system 700 can be implemented using a modified ANS entropy coding module 216 or in any other system that requires encoding. The modified ANS entropy coding method 800 can be performed by a computer device, such as device 1100 described below. The flow diagram represented in FIG. 8 is intended to be exemplary in nature and not limiting.

With further reference to FIG. 8, the modified ANS entropy coding method 800 obtains data 704 (Step 804). The data 704 can be residual information and/or other data such as metadata or the like. The method 800 represents the data 704 into another format 708a, 708b, 708c, 708d (Step 808). For example, the data 704 is converted, interpreted, or transformed into an array 708a, 708b, 708c, 708d. In one example, the format 708a, 708b, 708c, 708d can be interpreted as arrays of bits or transformed to its binary representation. In one example, the array 708a, 708b, 708c, 708d is binary format that includes a mantissa-exponent representation. For example, 708a represents zero, 708b represent signs, 708c represents exponential, and 708d represents mantissa. It should be understood that the data 704 can be interpreted or even transformed into other formats. In one example, interpreting the data 704 into another format or transforming the data 704 into another format allows the probability of each portion or bit of the representation 708a, 708b, 708c, 708d to be better estimated. In one example, by interpreting the symbols of the data 704 as an array of bits and encoding each bit with a separate probability table allows for the update operation to take O (log(S)) time, which can be faster. In one example, if there are 255 symbols, it can be represented using 8 bits log 2 (255)=8. Therefore, only 8 values will need to be updated rather than 255.

The method 800 uses one or more encoders 712a, 712b, 712c, 712d, 712e, 712f to process the formatted data or converted data 708a, 708b, 708c, 708d (Step 812). In one example, each coder is processing one bit of the bit-wise representation of the symbol/residual. For example, if the residual value 704 is −123, then the data is converted to its binary representation of 1 as the zero bit 708a, 1 as the sign bit 708b, 7 as seven exponential bits 708c, and 8 as eight mantissa bits 708(d). In this example, since the exponential bits 708c are 7 bits and the mantissa bits 708d are 8 bits, they may use multiple coders 712c-712d and 712e-712f to encode the exponential bit 708c and the mantissa bit 708d. In this example, the zero bit 708a and sign bit 708b is only 1, therefore they will each use one coder 712a and 712b. In one example, the residuals exhibiting similar statistical properties are encoded using the same coders 712a, 712b, 712c-712d, 712e-712f. It should be understood that a plurality of exponential bits and a plurality of mantissa bits can be used. It should also be understood that there could be no zero bit or no sign bit or no exponential bits or no mantissa bits or a combination of any one of the zero bit, sign bit, one or more exponential bits, and one or more mantissa bits or the like.

The method 800 combines the result of the coders 712a, 712b, 712c-712d, 712e-712f into a data range 716 (Step 816). For example, the data range 716 can represent a binary data range 716. The data range 716 can be provided to the output stream 720.

Exemplary Implementations for Probabilistic Context Evaluation Module

Figure 9:
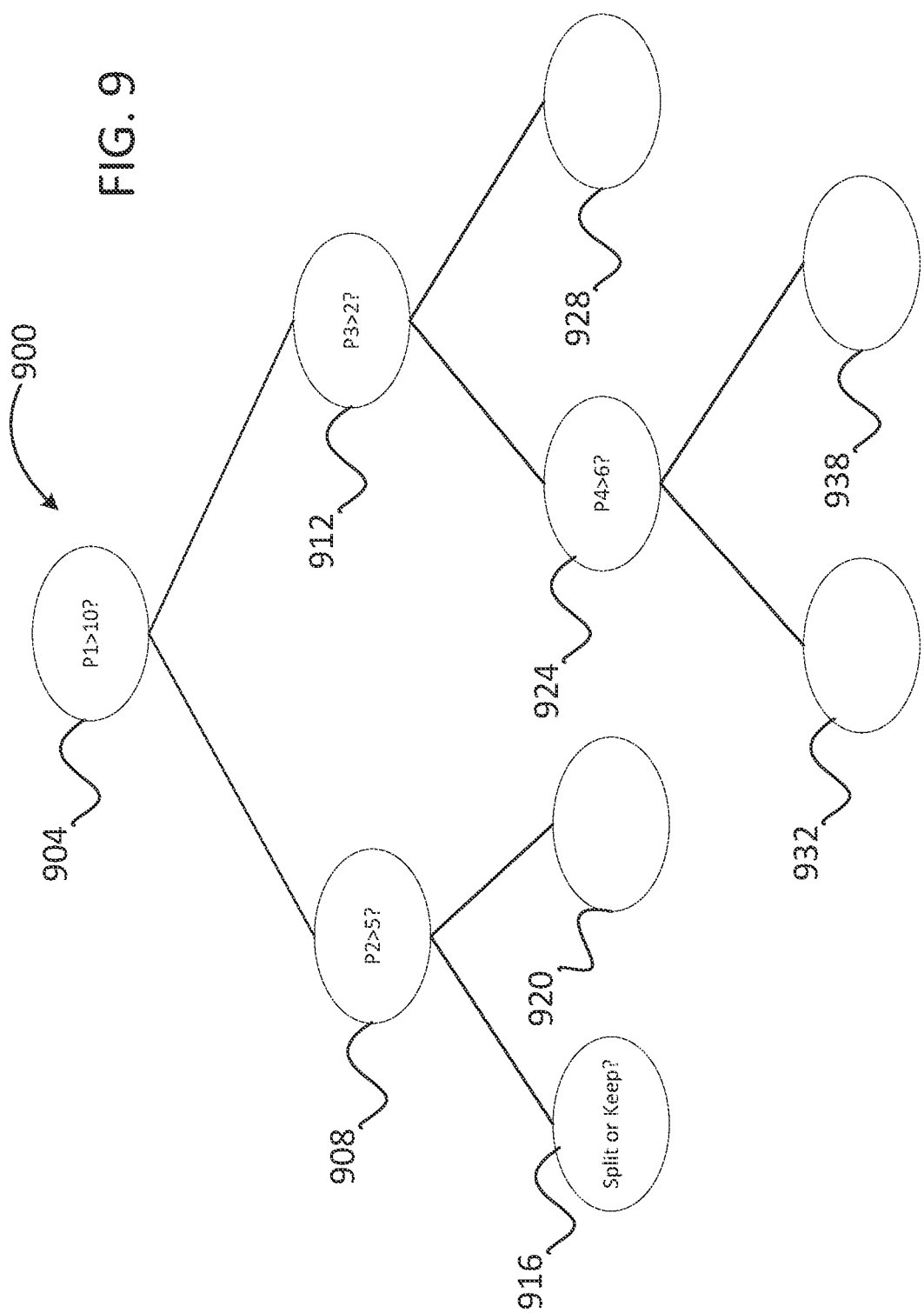
FIG. 9 is a diagram of a tree for implementing aspects of the probabilistic context evaluation module described herein.
Figure 10:
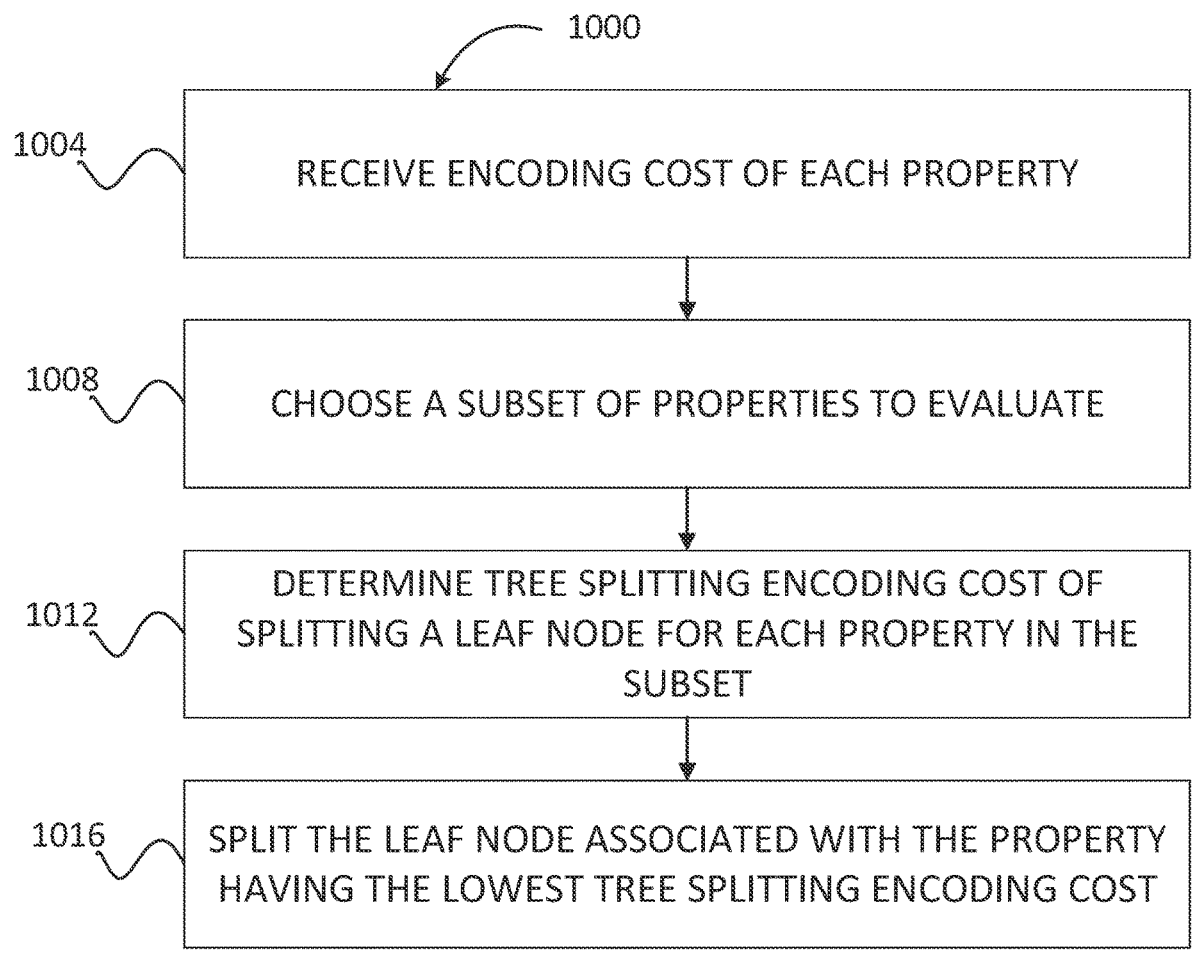
FIG. 10 is a flow diagram of an exemplary probabilistic context evaluation method in accordance with embodiments described herein.

With references to FIG. 9 and FIG. 10, FIG. 9 is a diagram of a tree 900 for implementing aspects of the probabilistic context evaluation method using evaluation of virtual contexts described herein, and FIG. 10 is a flow diagram of an exemplary probabilistic context evaluation method 1000. The probabilistic context evaluation method 1000 can be performed by a computer device, such as device 1100 described below or a probabilistic context evaluation module 214. The flow diagram represented in FIG. 10 is intended to be exemplary in nature and not limiting.

During context-modeling, a decision tree 900 can be trained on-the-fly for each image channel. The properties of a pixel are used to route the pixel through the nodes 904, 908, 912, 916, 920, 924, 928, 932, 938 to get one of the leaf nodes 916, 920, 928, 932, 938. Each leaf node 916, 920, 928, 932, 938 can contain one or more contexts. In conventional systems, when pixels are processed during training of the tree 900, all the contexts are evaluated. This typically takes a significant amount of time. It should be noted that the context can be actual context or virtual context. An actual context can be used to encode a pixel residual. A virtual context can store two sub-contexts. In one example, the pixel value is not directly encoded but the residual value (pixel—pixel prediction) is encoded.

In the tree 900, a pixel is routed to one of the leaf nodes 916, 920, 928, 932, 938 based on one or more properties of the pixel. The pixel can be virtually encoded to the leaf node in order to compute a cost associated with each virtual context. For example, splitting a leaf node into two new leafs can be encoded virtually and the new virtual tree structure's encoding cost can be evaluated, determined, or estimated. If the virtual context is found to yield a lower compression bit cost than the actual context, then the leaf node can be split into two more leaf nodes 916, 920, 928, 932, 938. In one example, this refers to learning the tree. Evaluating the virtual contexts allows to build the tree. This may yield an overall better compression ratio.

In this regard, in an exemplary method 1000 of a probabilistic context evaluation module using evaluation of the virtual contexts and/or properties, it is assumed that the virtual contexts and/or properties of the pixels do not have an equal chance to be chosen to split the leaf node. In an exemplary method 1000, an encoding cost is obtained for each virtual context and/or property (Step 1004). In one example, the encoding cost can be obtained when the virtual context is evaluated. The encoding cost can be the performance of that context. The tree is split, when a virtual context yields better performance. A lower encoding cost can determine a better performance. The encoding cost is based on the encoding cost of the property. In one example, a context is defined by a particular combination of the properties (for e.g. all pixels whose intensity is above 50 are part of the same context).

A subset of virtual contexts and/or properties (the number of virtual contexts/properties in the subset are denoted as K) is chosen for evaluation (Step 1008). In one example, if there are 10 virtual contexts, it can be expensive computationally to evaluate all of them. The probabilistic context evaluation module selects a subset to evaluate and can base that selection on the context that can are most likely to result in better performance. The number K of virtual contexts and/or properties chosen can be a random number, can be provided as an input, can be determined by an algorithm, can be predetermined, can be a parameter set according to the type of image, data, contexts or the like, or a combination. In one example, the probability of each virtual context and/or property being chosen is inversely proportional to the encoding cost of that virtual context. As such, the lower the encoding cost of the virtual context, the higher the chances it can be chosen for evaluation. In one example, if the value 100010 (6 bits) is encoded, an output of the entropy coder inside each context 11 (2 bits) can be obtained. If another context produces output 1100 (4 bits), the first context can be determined to have better compression performance. Therefore, the method 1000 evaluates a portion of the virtual contexts and/or properties and does not evaluate all the virtual contexts and/or properties. This can allow to reduce the compression ratio in the image compression. In one example, the method can improve the speed of execution. This method may adversely affect the compression performance because not all the possible virtual contexts are being evaluated anymore. Rather only a subset of virtual contexts are being evaluated. In one example, given 100 bits, if the compression schemes reduces to 30 bits, then there is a 70% compression ratio (i.e. takes 100 bits and produces 30).

In some embodiments, the compression time can be reduced with minimal reduction of the compression ratio based on the value of the evaluation number K of virtual contexts and/or properties. For example, if a subset of the virtual contexts for each leaf node is evaluated, then we can save in compute because we are not evaluating all possible virtual contexts. In this context, reducing the compression ratio is a negative thing. 70% compression ratio is better than 65% compression ratio. By setting different values of K, the compression time can be tuned to satisfy different requirements such as computation capability, time budget or the like. For example, given the time budget, different values of K are used as the pixels are encoded to regulate compression time. In one embodiment, more time (or for example a higher K value) can be allocated to the early pixels to be encoded, as those pixels may influence the top levels of the decision tree 900. This may allow for an accurate and precise evaluation. As the tree grows 900, the pixels can be divided into a finer cluster. In one example, a quicker evaluation of the virtual context and/or property can be performed. However, this can lead to a degradation of the compression performance. In one example, if a tree is being build, the first pixels can have a higher influence in splitting the highest level of the tree because those pixels are the first pixels to be evaluated. As such, in one example, all the virtual contexts can be used to avoid introducing one or more errors in this phase. When most of the tree is built, the amount of virtual contexts to evaluate can be reduced since the tree may be more or less stable. In one example, as the tree is being built in in deeper levels, more and more leaves and/or contexts and/or clusters are being created. The method determines an encoding cost of each chosen (K) virtual context and/or property (Step 1012). Based on the encoding cost, the tree is built by either splitting a leaf node or not splitting the leaf node (Step 1016). The leaf node can be split based on properties or features. For example, a moving average is maintained for all virtual contexts and/or properties. In one example, if the encoding cost of splitting the leaf node is more than the moving average, then the leaf node is not split. In another example, if cost of splitting the leaf node is marginally more than the moving average by a range or percentage or other parameter, then the leaf node is not split. This range or percentage or other parameter can be predetermined, provided as an input, or determined by an algorithm or the like or a combination. In one example, if the encoding cost of splitting the node is less than the moving average, then the leaf node is split. In another example, if the encoding cost of splitting the leaf node is less the moving average by a range or percentage then the leaf node is split.

Table 1 below is an example of an implementation of the probabilistic context evaluation module using evaluation of the properties. This example is based on the tree 900 illustrated in FIG. 9.

TABLE 1

| PROPERTIES | AVERAGE | ESTIMATED ENCODING COST | | ENCODING COST OF NOT SPLITTING TREE |
|---|---|---|---|---|
| | | LEFT NODE | RIGHT NODE | |
| P0 | 2 | 10 | 20 | 8 |
| P1 | 4 | 30 | 10 | 8 |
| P2 | 6 | 4 | 4 | 8 |
| P3 | 1 | 20 | 21 | 8 |
| P4 | 34 | 18 | 15 | 8 |

In the example seen in Table 1, P0, P1, P2, P3, and P4 are the properties of the pixels. The moving average for all the properties is listed. For example, the moving average for property P0 is 2. The estimated cost of splitting is also listed. For example, the estimated cost of splitting property P0 to the left node is 10 and the estimated cost of splitting property P0 to the right node is 20. Therefore, the total estimated cost of splitting property P0 is 30 (sum of 10 and 20). The total cost is the cost of the tree 900 without any splitting. In this example, the total cost of the tree 1100 without any splitting is 8. As seen in Table 1, not all property are equal. For example, Property P1 has a total estimated cost of 40 (30 for splitting left node and 10 for splitting right node). If a property has a higher estimated cost, it may have a lower chance to have the lowest estimated cost. Therefore, there is less need to evaluate property P1. The estimated cost for P2 after splitting is 8 as seen in Table 1. Therefore, it may be useful to evaluate property P2 and another property rather than property P1 since the total estimated cost for P2 is lower than P1. For example, according to the method 1200, the tree 1100 can be evaluated splitting on property P2 from Table 1. Since the estimated cost of splitting the property P2 is less than the total cost of not splitting, the method 1200 might split the property P2.

Exemplary Operating Environment

Having described implementations of the present disclosure, an exemplary operating environment in which embodiments of the present technology may be implemented is described below in order to provide a general context for various aspects of the present disclosure. Referring initially to FIG. 11 in particular, an exemplary operating environment for implementing embodiments of the present technology is shown and designated generally as computing device 1100. Computing device 1100 is but one example of a suitable computing environment and is not intended to suggest any limitation as to the scope of use or functionality of the technology described herein. Neither should the computing device 1100 be interpreted as having any dependency or requirement relating to any one or combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology described herein may be practiced in a variety of system configurations, including hand-held devices, consumer electronics, general-purpose computers, more specialty computing devices, etc. The technology described herein may also be practiced in distributed computing environments where tasks are performed by remote-processing devices that are linked through a communications network.

With reference to FIG. 11, computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 11 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 1100. The computing device 1100 may be equipped with depth cameras, such as, stereoscopic camera systems, infrared camera systems, RGB camera systems, and combinations of these for gesture detection and recognition. Additionally, the computing device 1100 may be equipped with accelerometers or gyroscopes that enable detection of motion.

Aspects of the present technology have been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however, the distributed computing environment depicted herein is merely exemplary. Components can be configured for performing certain embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media having computer-executable instructions embodied thereon that, when executed by one or more processors, cause the one or more processors to perform a method, the method comprising:
  obtaining an image for performing image compression, the image having a set of pixels represented via a decision tree;
  traversing the decision tree using a speculative-based approach by:
    determining, via an assumption, that a pixel of the set of pixels shares a context with another pixel of the set of pixels;
    based on the pixel sharing the context with the another pixel, encoding or decoding the pixel in association with the context shared with the another pixel;
    verifying the assumption for the pixel, in parallel, by navigating the decision tree to determine that the pixel accurately corresponds with the context; and based on the determination that the pixel accurately corresponds with the context, continuing to process one or more additional pixels, and when it is determined that the pixel inaccurately corresponds with the context, returning to the pixel to perform a new encoding or a new decoding of the pixel in association with a correct context.

2. The media of claim 1, wherein the determination that the pixel accurately corresponds with the context includes:

decoding a mask associated with the another pixel, the mask indicating similarity of the context of the another pixel with the context of the pixel; and evaluating the mask to determine that the context of the another pixel is similar to the context of the pixel.

3. The media of claim 2, wherein the mask is a binary mask.

4. The media of claim 1, wherein verifying the assumption for the pixel is performed in the background using a thread.

5. The media of claim 4, wherein the thread is part of a thread pool.

6. The media of claim 5, wherein a plurality of verifications for pixels in the set of pixels are performed in the background using the thread pool, the thread pool including a plurality of threads.

7. The media of claim 6, further comprising:

pausing a thread of a corresponding pixel when the assumption is incorrect for the corresponding pixel and returning to the corresponding pixel with the incorrect assumption to navigate the pixel to a correct leaf node.

8. The media of claim 7, further comprising:

resetting a current pixel position and a file pointer position of the thread when the assumption is incorrect for the corresponding pixel.

9. The media of claim 1, further comprising: using a machine learning algorithm to determine whether to perform the speculative-based approach.

10. The media of claim 9, wherein using the machine learning algorithm to determine whether to perform the speculative-based approach to tree-traversal further includes:

obtaining a region of an image;

analyzing the region using the machine learning algorithm to determine whether to perform the speculative-based approach to tree-traversal; and performing the speculative-based approach to tree-traversal when the machine learning algorithm indicates that a majority of pixels in the region have similar context.

11. A method comprising:

obtaining an image for performing image compression, the image having a set of pixels represented via a decision tree;

traversing the decision tree using a speculative-based approach by:

determining, via an assumption, that a pixel of the set of pixels shares a context with another pixel of the set of pixels;

based on the pixel sharing the context with the another pixel, encoding or decoding the pixel in association with the context shared with the another pixel;

performing verification of the assumption for the pixel, in parallel, by navigating the decision tree and determining that the pixel inaccurately corresponds with the context; and based on the determination that the pixel inaccurately corresponds with the context, performing a new encoding or a new decoding in association with the pixel using a correct context.

12. The method of claim 11, wherein the determination that the pixel inaccurately corresponds with the context includes:

decoding a mask associated with the another pixel, the mask indicating similarity of the context of the another pixel with the context of the pixel; and evaluating the mask to determine that the context of the another pixel is dissimilar to the context of the pixel.

13. The method of claim 12, wherein the mask is a binary mask.

14. The method of claim 11, wherein performing the verification of the assumption for the pixel is performed in the background using a thread.

15. The method of claim 14, wherein the thread is part of a thread pool.

16. The method of claim 15, wherein a plurality of verifications for pixels in the set of pixels are performed in the background using the thread pool, the thread pool including a plurality of threads.

17. The method of claim 16, further comprising:

pausing a thread of a corresponding pixel when the assumption is incorrect for the corresponding pixel and returning to the corresponding pixel with the incorrect assumption to navigate the pixel to a correct leaf node.

18. The method of claim 17, further comprising:

resetting a current pixel position and a file pointer position of the thread when the assumption is incorrect for the corresponding pixel.

19. The method of claim 18, further comprising:

using a machine learning algorithm to determine whether to perform the speculative-based approach.

20. One or more computer storage media having computer-executable instructions embodied thereon that, when executed by one or more processors, cause the one or more processors to perform a method, the method comprising:

obtaining an image for performing image compression, the image having a set of pixels represented via a decision tree;

traversing the decision tree using a speculative-based approach by:

determining, via an assumption, that a pixel of the set of pixels shares a context with another pixel of the set of pixels;

based on the pixel sharing the context with the another pixel, encoding or decoding the pixel in association with the context shared with the another pixel;

verifying the assumption for the pixel, in parallel, by navigating the decision tree to determine whether the pixel accurately corresponds with the context, wherein when the pixel accurately corresponds with the context, continuing to process one or more additional pixels, and when the pixel inaccurately corresponds with the context, performing a new encoding or a new decoding in association with the pixel using a correct context.

\* \* \* \* \*